July 26, 1960  R. L. BEYERSTEDT  2,946,238
MOTOR VEHICLE TRANSMISSIONS
Filed July 21, 1958  4 Sheets-Sheet 1

Inventor:
Ralph L. Beyerstedt
Atty.

July 26, 1960 R. L. BEYERSTEDT 2,946,238
MOTOR VEHICLE TRANSMISSIONS
Filed July 21, 1958 4 Sheets-Sheet 4

Inventor:
Ralph L. Beyerstedt
Paul O. Pippel
Atty.

United States Patent Office 2,946,238
Patented July 26, 1960

2,946,238

MOTOR VEHICLE TRANSMISSIONS

Ralph L. Beyerstedt, Libertyville, Ill., assignor to The Frank G. Hough Co., a corporation of Illinois Filed July 21, 1958, Ser. No. 750,029

1 Claim. (Cl. 74—665)

This invention relates generally to transmissions for motor vehicles, and more specifically to an improved transmission arrangement for rubber-tired vehicles of the four-wheel driven type and has particular application to material handling equipment such as tractor loaders.

As is known in the art, tractor loaders specially of the front end type generally comprise a four-wheeled vehicle having a tool or material handling device operatively carried from the forward end of the vehicle. In the operation of these tractor loaders it is well known that the tractor or vehicle is repeatedly moved forwardly to force or work the tool into the material being removed or worked, and rearwardly generally short distances to dump the material which has been worked into the tool or bucket of the loader. Under such conditions of operation it has been found desirable to drive all four of the wheels of the tractor in order to provide for maximum tractive effort in the necessary working of the material.

In the operation of these machines or loaders it is also necessary that they travel upon the highway at speeds considerably higher than those tractor speeds at which material is being worked. During such travel at relatively higher speeds it is desirable that the drive be to only two of the wheels since for any small difference in the drive to the rear or front wheels, such as for example if there is a slight difference in tire size, there will result a constant drag on either the forward or rearward wheels.

It is the object of the present invention to provide a transmission arrangement for a motor vehicle which is selectively operable to drive either the forward or both the forward and rearward wheels of a motor vehicle.

It is a further object of the present invention to provide a transmission arrangement for a tractor loader in which the tractor cannot be driven at relatively high speeds when the transmission drives all four wheels of the tractor and wherein all four wheels of the tractor are automatically driven when the transmission is shifted into the relatively low speed ranges.

It is a further object of the present invention to provide a transmission for a tractor loader in combination with another transmission such that the first transmission arrangement provides for two ranges of speed thereby multiplying the effective number of ranges of speed of the second transmission.

It is further an object of the present invention to provide a tractor with a selectively operable two-speed two-direction transmission for operation in series with another transmission with the latter transmission providing that in the low speed range the tractor is operated with all four wheels being driven and in the higher range the tractor is operated with only two of the wheels being driven.

It is a feature of the present invention that the transmission is provided with an internally mounted parking brake.

Other subjects and features of the present invention will be apparent upon the perusal of the following specification and drawings of which:

The present embodiment is the preferred embodiment but it is to be understood that changes can be made in the present embodiment by one skilled in the art without departing from the spirit of the scope of the present invention.

Figure 1:
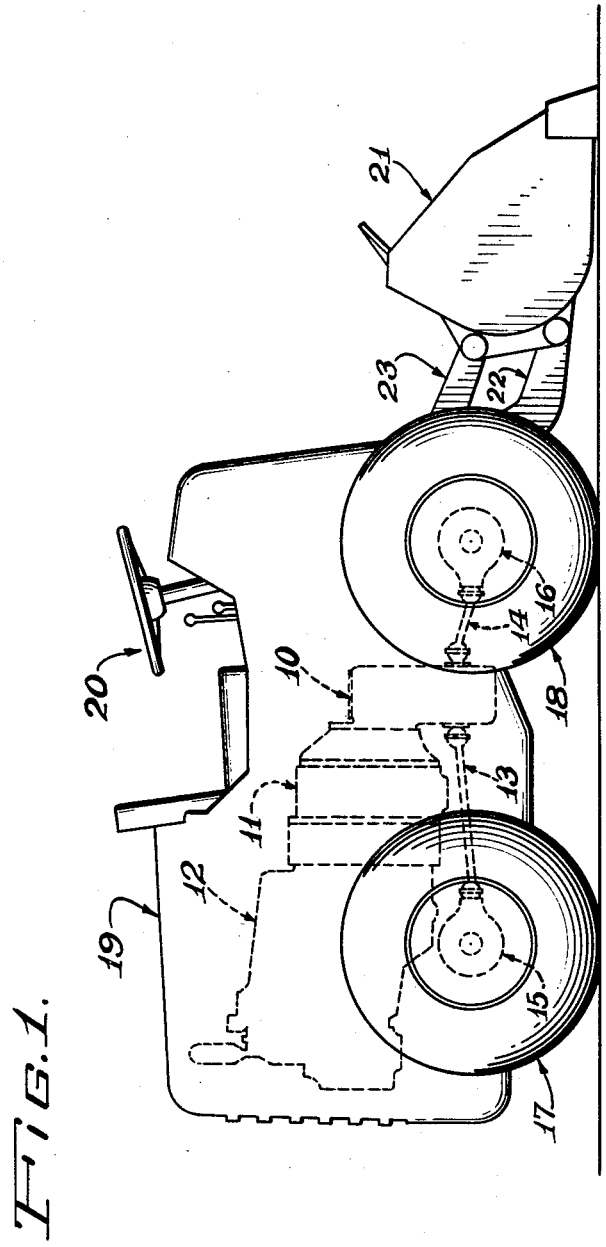
Figure 1 is a side elevational view of a tractor loader structured according to the present invention.

Referring to Figure 1 for a general description of the present invention, this invention is primarily concerned with the construction details of transmission 10 which is mounted on the output end of a conventional two speed forward-reverse transmission 11 which in turn has its input shaft connected to the engine 12. The two output shafts 13 and 14 of the transmission 10 are respectively connected to differentials 15 and 16. Differential 15 is connected through suitable axles to drive the rear wheels 17, and differential 16 is connected through suitable axles to drive the front wheels 18 of the tractor 19.

The tractor 19 comprises a suitable operator's compartment 20, and is provided with a bucket 21 operatively carried on the forward end thereof through suitable boom and linkage means 22 and 23 which are connected to the tractor 19 by any suitable means.

The transmission 10 is provided with two operating levers (not shown) independent of the operating means or levers for transmission 11. One of the levers for transmission 10 controls its operation to either of the high or low speed ranges and the other lever controls the application of the parking brake. When the first lever is operated to the low range the transmission is also simultaneously operated to extend the drive to both output shafts, and when the lever is operated to the high range the four wheel drive is automatically disconnected and the output of the transmission 10 is then delivered only to the front wheels of the tractor 19. The tractor may not be operated in four wheel drive in the high speed range.

Figure 2:
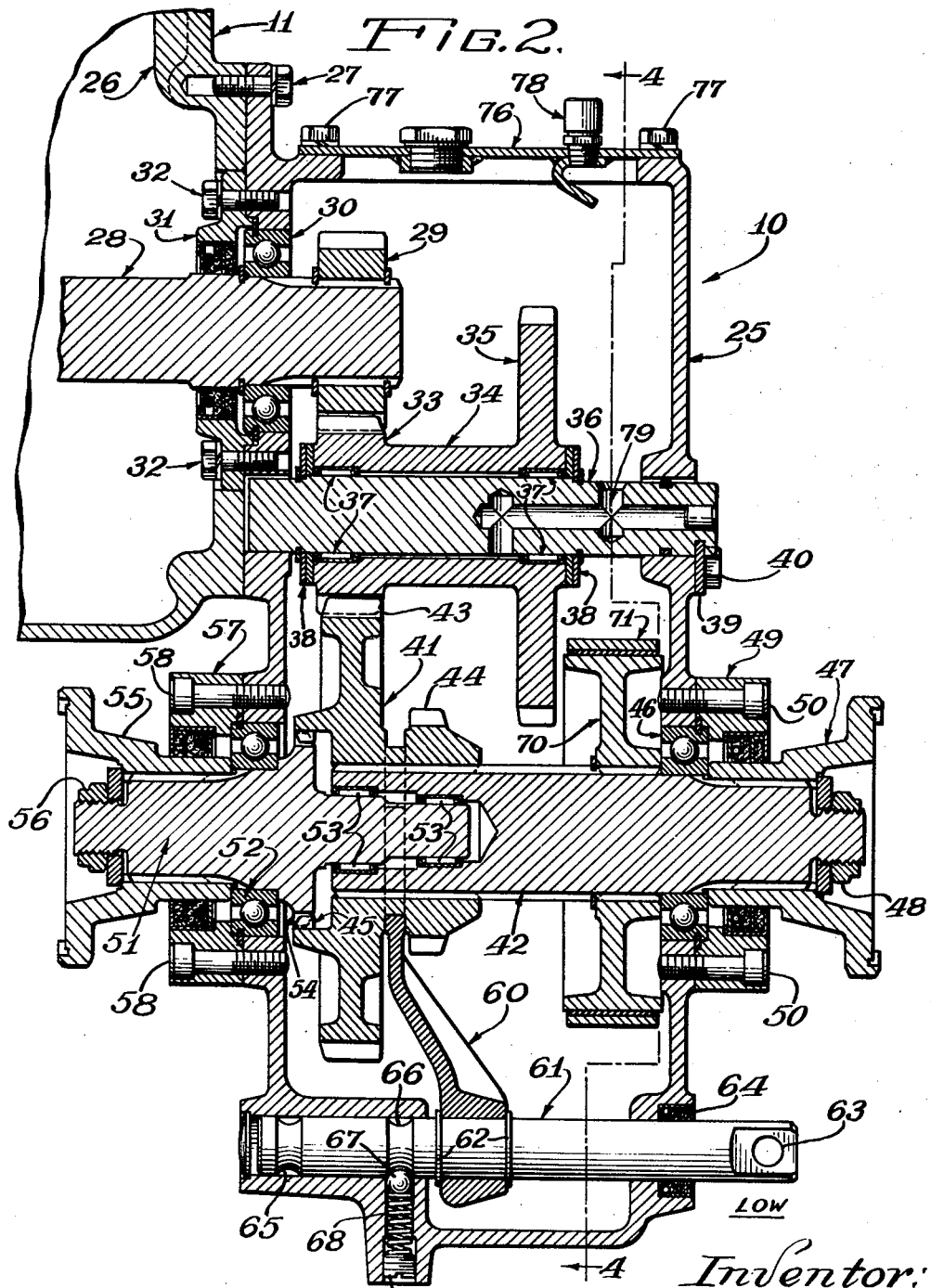
Figure 2 is an enlarged cross-sectional view of the transmission of the subject invention shown in Figure 1 with the transmission operated to the low speed range.
Figure 3:
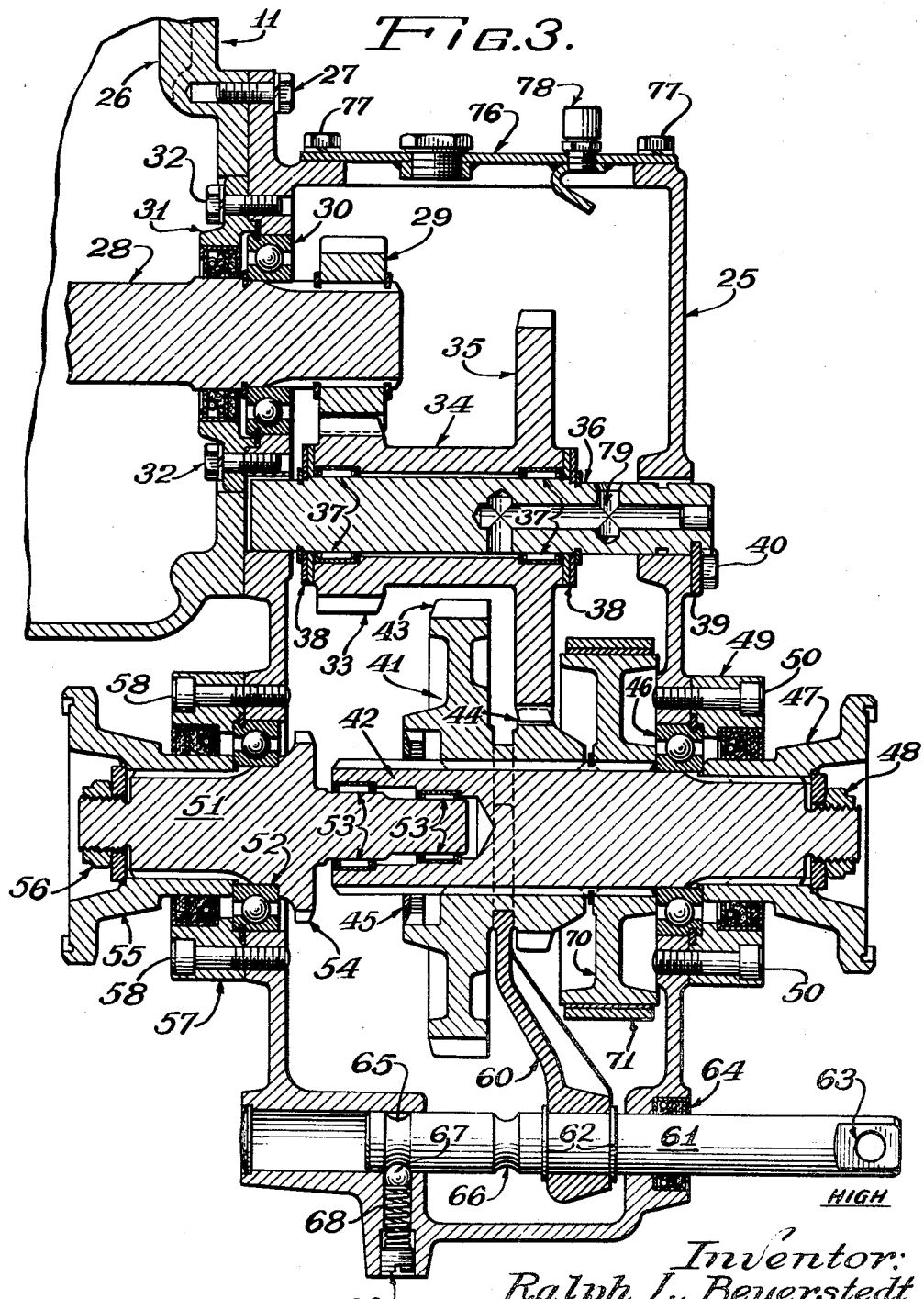
Figure 3 is a view identical to Figure 2 with the transmission operated to the high speed range.
Figure 4:
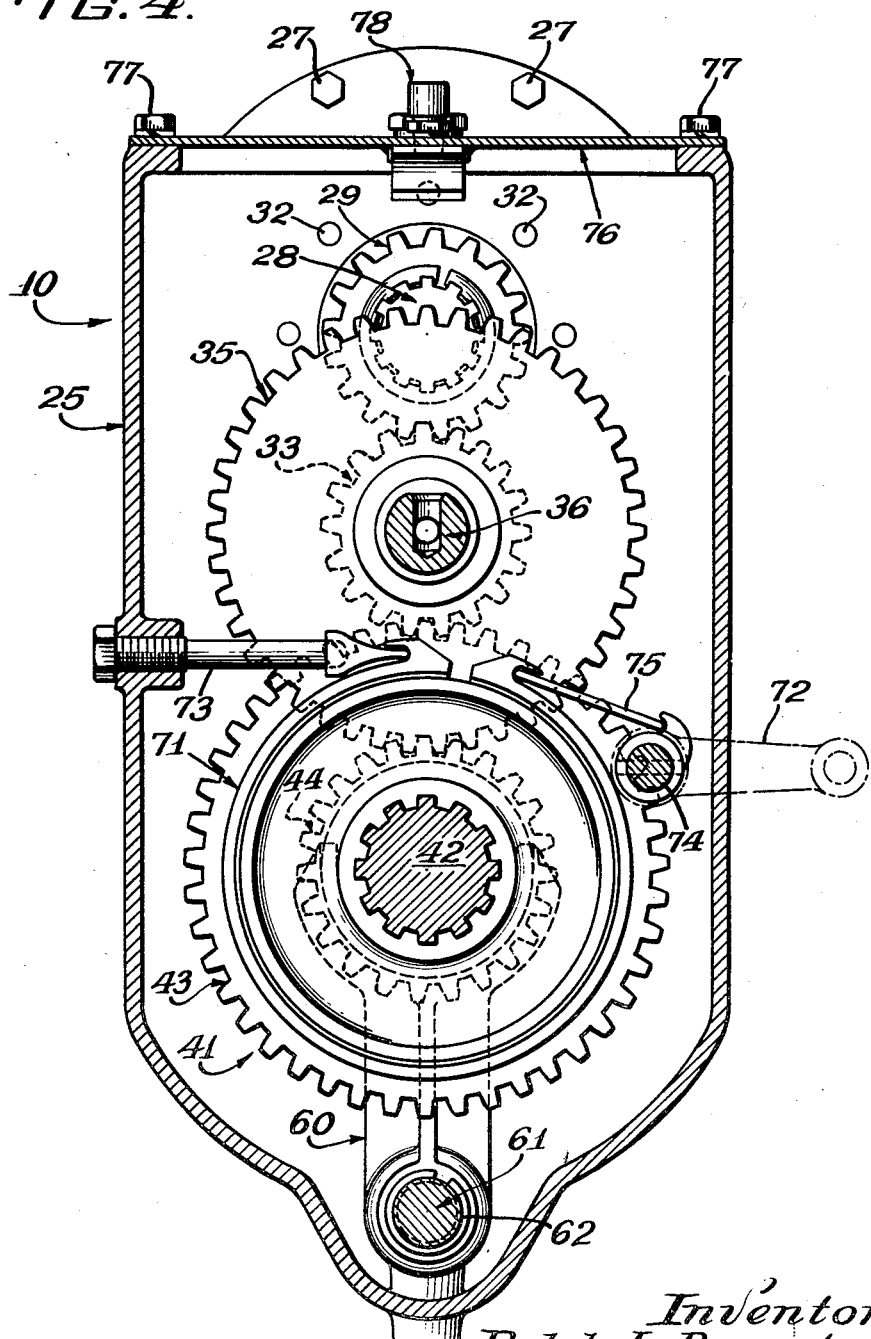
Figure 4 is a cross-sectional view of the transmission taken along the line 4—4 of Figure 2.

For a detailed description of the present invention reference is made to Figures 2 to 4. The transmission 10 comprises a housing or transmission casing 25 which is bolted to the casing or housing 26 of the transmission 11 by suitable bolts such as bolt 27. The output shaft 28 of the transmission 11 projects into the housing 25 of the transmission 10 and the end thereof is provided with a gear 29 keyed thereupon. The output shaft 28 of the transmission 11 is rotatively supported by a ball bearing set 30 carried in a suitable opening in the housing 25. A sealing arrangement 31 is disposed on the shaft 28 and is secured to the housing 25 by bolts 32. The gear 29 meshes with a gear 33 which is formed on one end of a tubular member 34. The other end of the tubular member 34 is provided with a larger gear 35 formed thereon. The cylindrical member 34 is rotatively mounted on a shaft 36 by means of needle bearings 37. Retainers 38 keyed to the shaft 36 at each end of the cylindrical member 34 prevent any movement of the cylindrical member 34 along the longitudinal axis of the shaft 36. The shaft 36 is carried in suitable openings through opposite walls of the housing 25 of the transmission 10 and is secured against any movement by a key 39 and a bolt 40.

A sliding gear assembly 41 is provided for cooperation with the gears 33 and 35. The gear assembly 41 is splined on a shaft 42 and comprises gear teeth 43 formed about a certain diameter for meshing with the gear 33, gear teeth 44 formed about a certain diameter substantially smaller than the diameter for gear teeth 43 and sufficient for proper meshing with the gear 35, and positive clutch teeth 45 defining internal clutch teeth. The shaft 42 upon which the gear assembly 41 is splined is rotatively carried through one wall of the housing 25 by means of a ball bearing set 46. One half of a universal joint 47 is secured on the outer end of the shaft 42 by means of a nut 48. The universal 47 is connected to shaft 14 shown in Figure 1. A sealing assembly 49 is disposed about the outer end of the shaft 42 and secured to the housing 25 by bolts 50. The inner end of the shaft 42 is rotatively mounted on the inner end of a stub shaft 51 which is rotatively carried through one wall of the housing 25 by a ball bearing set 52. The inner end of the stub shaft 51 is journalled within the inner end of the shaft 42 and is provided with bearings 53. Positive clutch teeth 54 are formed on the stub shaft 51 within the housing 25 and adjacent end of the shaft 42. The external clutch teeth 54 are of a size and on a diameter such that they can mesh with the internal clutch teeth 45 of gear assembly 41, as shown in Figure 2. The outer end of the stub shaft 51 is provided with part of the universal joint 55 which is secured thereon by nut 56. The universal joint 55 is connected to the shaft 13 shown in Figure 1. The stub shaft 51 is further provided with a sealing assembly 57 which is disposed thereabout and secured to one wall of the housing 25 by means of bolts 58. Thus it may be seen that when the gear assembly 41 is moved to the position shown in Figure 2, gear teeth 43 will mesh with gear 33, and clutch teeth 45 will mesh with the clutch teeth 54. When the gear assembly 41 is moved to the position shown in Figure 3, gear teeth 44 will mesh with gear 35, and gear teeth 43 and clutch teeth 45 will be disengaged from gear 33 and clutch teeth 54.

A shifting fork 60 is provided for moving the gear assembly 41 to its two noted positions. The shifting fork 60 engages a slotted section in the gear assembly 41 and is locked to a shaft 61 by means of the locking rings 62. Shaft 61 is slidably carried in a suitable bore formed in the housing 25, and one end thereof projects from the housing and is provided with means 63 for connection of operating levers and linkages (not shown) thereto. It is intended that a suitable operating lever (not shown) be provided in the operator's compartment 20 for selective movement of the shaft 61. Shaft 61 is provided with an oil seal 64 disposed thereabout and carried in the housing 25 and is formed with two annular grooves 65 and 66. The annular grooves 65, 66 cooperate with a detent ball 67 and spring 68 to index the shaft 61 in either of its two operated positions. The detent ball 67 and spring 68 are disposed in a cylindrical bore formed through housing 25 and are retained therein by a set screw 69. The annular grooves 65 and 66 are so positioned longitudinally of the shaft 61 that when the detent ball 67 engages annular groove 66, the shifting fork 60 is disposed as shown in Figure 2 with the gear teeth 43 of gear assembly 41 meshing with gear 33 and with the clutch teeth 45 meshing with clutch teeth 54, and so that when detent ball 67 engages annular groove 65, such as shown in Figure 3, the shifting fork 60 is disposed so that the gear teeth 44 mesh with gear 35.

Shaft 42 is also provided with a brake assembly which may be operated when the vehicle is parked. This brake assembly comprises a brake drum 70 which is splined and keyed onto the shaft 42, a brake band 71, and an operating lever 72. The brake band 71 is disposed about the brake drum 70 and one end thereof is anchored to the housing 25 through a link 73. The operating lever 72 is pivotally carried at one end thereof on the housing 25 by shaft 74. A brake strut or link 75 engages at one end thereof the other end of the brake band 71 and at the other end thereof a projection on the lever 72 such that when the lever 72 is pivoted counterclockwise as shown in Figure 4, the strut 75 is moved to tighten the brake band 71 about the brake drum 70. The upper end of the housing 25 is provided with a cover plate 76 which is secured thereto by bolts 77. The cover plate 76 carries a lubricating fluid assembly 78 for delivering lubricating oil to the transmission 10. The passageways 79 formed in the shaft 36 serve to distribute lubricating oil to the bearings 37 of the cylindrical member 34.

In the operation of the present invention, when the shaft 61 is operated so that the detent ball 67 engages annular groove 66 in shaft 61, such as shown in Figure 2, the transmission 11 will drive the gear 29, which in turn will drive gear 33. Gear 33 will drive gear teeth 43 of gear assembly 41 and gear assembly 41 will simultaneously drive shafts 42 and 51. This will result in a drive of all four of the wheels 17 and 18 of the tractor.

When the shaft 61 is operated so that the detent ball 67 engages annular groove 65 in shaft 61, such as shown in Figure 3, the transmission 11 will drive the gear 29, which in turn will drive gear 35 through gear 33 and the cylindrical member 34. Gear 35 will drive gear teeth 44 of the gear assembly 41, and gear assembly 41 will drive shaft 42. This will result in a drive of only the forward wheels 18 of the tractor.

Since gear 33 is substantially smaller than gear 35 and since gear teeth 43 are disposed about a substantially greater diameter than gear teeth 44, a substantially lower speed ratio results when gear teeth 43 of the gear assembly 41 mesh with gear 33 than when the gear teeth 44 of the gear assembly 41 mesh with the gear 35. Thus it may be seen that when the shaft 61 is moved to cause gear 33 to engage gear teeth 43 of the gear assembly 41, all four wheels 17 and 18 of the tractor are driven in the low speed range. When the shaft 61 is moved to cause gear teeth 44 of the gear assembly 41 to engage gear 35, the drive to the rear wheels 17 is disconnected and the forward wheels 18 of the tractor are driven in the high speed range.

Having described the invention what is considered new and desired to be protected by Letters Patent is:

In a vehicle transmission having a substantially sealed housing, an input shaft rotatively carried through one wall of said housing, an output shaft rotatively carried through one wall of said housing, a second output shaft rotatively carried through a wall of said housing opposite from that of said first output shaft, the inner end of said first output shaft being formed to have an extending portion of a reduced diameter which is journalled in bearing means formed in the inner end of said second output shaft, each of said input shaft, and said first and second output shafts being peripherally sealed against the leakage of any lubricating fluid from said housing, gearing means comprising a pair of gears formed on a cylindrical member, said cylindrical member rotatably carried upon a shaft, said shaft carried between opposite walls of said housing, means connecting said input shaft to drive one of said pair of gears, a brake drum splined on said second output shaft within said housing against one wall thereof, a brake band operatively carried in said housing in cooperation with said brake drum for manual operation thereof externally of said housing, second gearing means comprising a sliding gear assembly splined upon said second output shaft inwardly of said brake drum, a first positive clutch member of external clutch teeth formed on said first output shaft, said sliding gear assembly comprising a first gear and a second gear and a second positive clutch member of internal clutch teeth, said first, and second gears and said internal clutch teeth of said sliding gear assembly being formed so that said internal clutch teeth engage said external clutch teeth formed on said first output shaft and said second gear engages said one of said gears of said pair of gears when said sliding gear is moved in one direction and so that said internal clutch teeth are disengaged from said external clutch teeth formed on said first output shaft and said second gear is disengaged from said one gear of said pair of gears and said first gear of said sliding gear assembly engages the other gear of said pair of gears when said sliding gear assembly is moved in the other direction toward said brake drum.

References Cited in the file of this patent

UNITED STATES PATENTS

| | | |
|---|---|---|
| 2,256,974 | Dondlinger | Sept. 23, 1941 |
| 2,329,916 | Lamb et al. | Sept. 21, 1943 |
| 2,772,582 | Gerst | Dec. 4, 1956 |
| 2,851,115 | Buckendale | Sept. 9, 1958 |

FOREIGN PATENTS

| | | |
|---|---|---|
| 534,292 | Great Britain | Mar. 4, 1941 |